United States Patent [19]

Stephan

[11] 4,334,414
[45] Jun. 15, 1982

[54] UNIVERSAL JOINT YOKES
[75] Inventor: Gérard Stephan, Croissy, France
[73] Assignee: Nadella, France
[21] Appl. No.: 107,518
[22] Filed: Dec. 27, 1979
[30] Foreign Application Priority Data
Jan. 17, 1979 [FR] France .............................. 79 01080
[51] Int. Cl.³ .............................................. F16D 3/26
[52] U.S. Cl. ..................................... 464/134; 403/58; 403/157
[58] Field of Search ............. 64/17 A, 17 R; 403/157, 403/158, 159, 58, 230, 285

[56]     References Cited
U.S. PATENT DOCUMENTS

| | | | |
|---|---|---|---|
| 1,167,455 | 1/1916 | Watts | 64/17 R |
| 1,343,728 | 6/1920 | Kopf | 64/17 R |
| 2,977,776 | 4/1961 | Quinn | 64/17 R |
| 3,224,222 | 12/1965 | Palmer, Sr. | 64/17 R |
| 3,501,928 | 3/1970 | Pitner | 403/285 |
| 3,529,344 | 9/1970 | Pitner | 64/17 R |
| 3,901,048 | 8/1975 | Pitner | 64/17 R |

FOREIGN PATENT DOCUMENTS 1200466  12/1959  France .............................. 64/17 R Primary Examiner—P. S. Lall
Attorney, Agent, or Firm—Robert E. Burns; Emmanuel J. Lobato; Bruce L. Adams

[57]     ABSTRACT

Disclosed herein is a universal joint yoke 1 having a rotational axis Y—Y and an opposed pair of arms 3 with bores 9 having a common axis X—X; the sectional shape of the arms in that plane perpendicular to the rotational axis Y—Y and passing through the common bore axis X—X having end portions 10 inturned towards the rotational axis Y—Y so that a greater depth h of bore may be obtained than the bore depth h' of a yoke of equivalent radial size formed from the same thickness material e and having arms 16 wherein the corresponding section is part circular.

9 Claims, 5 Drawing Figures

UNIVERSAL JOINT YOKES

BACKGROUND OF THE INVENTION

The present invention relates to universal joint yokes and, in particular, relates to yokes formed from a sheet metal blank or a tube length, such as by cutting and cold rolling.

Universal joints are known to comprise two yokes each having a tubular hub for mounting on a transmission shaft or the like and a cross-piece the four trunnions of which each have a thin-walled bearing race mounted in a bore in a respective yoke arm. The rotational axis of the tubular hub and the common axis of the yoke arm bores defining a plane of symmetry in the yoke.

In order to ensure optimum support for each race in its bore on both sides of the plane of symmetry, a technique was proposed (in U.S. Pat. No. 3,501,928) to give a substantially circular-based cylindrical form to the yoke so that, in a plane perpendicular to the rotational axis and passing through the common axis of the bores, support was given by the two circular arcs centred on the rotational axis of the cross-piece and defining the cylindrical form.

Very satisfactory support for the bearing races and consequent adequate transmission of forces can be obtained by use of this technique in yokes formed from sheet metal blanks or tube lengths of sufficient thickness.

This technique has come into widespread use because of its numerous advantages but it has not been applied to lightened universal joints because of the insufficient race support that could be provided by a thin metal sheet or tube.

One known solution is to draw a peripheral neck from the sheet metal blank about the bore but this solution, apart from its complexity, makes the fitting of a cross-piece into the yoke by simple tilting impossible.

SUMMARY OF THE INVENTION

An object of the present invention is to remedy the stated drawbacks of this technique when applied to lightened universal joint yokes formed by cold deformation of a thin sheet metal or tube.

According to the present invention, a universal joint yoke formed from a sheet metal blank or tube length and comprising an opposed pair of arms each having a bore designed to receive a bearing race is characterized in that the section of each arm in that plane perpendicular to the rotational axis of the yoke and including the common axis of the bores has, when compared with the corresponding arm section of a yoke of substantially circular based cylindrical form within a substantially identical radial size and formed from a sheet blank or tube of equal thickness, a shape of which the end portions are inturned towards said rotational axis so that the depth of the bore is greater than that of the bore of said corresponding part-circular arm section.

By this means the support for the bearing that can be provided by a sheet or tube material of a given thickness is effectively increased, i.e. sufficient bearing race support can be provided by a thinner, lighter material.

In a preferred embodiment of the invention, the shape of said corresponding arm section has a substantially elliptical base.

BRIEF DESCRIPTION OF THE DRAWINGS

The above and other features of the present invention are illustrated, by way of example, in the drawings, wherein.

DETAILED DESCRIPTION OF THE INVENTION

Figure 1:
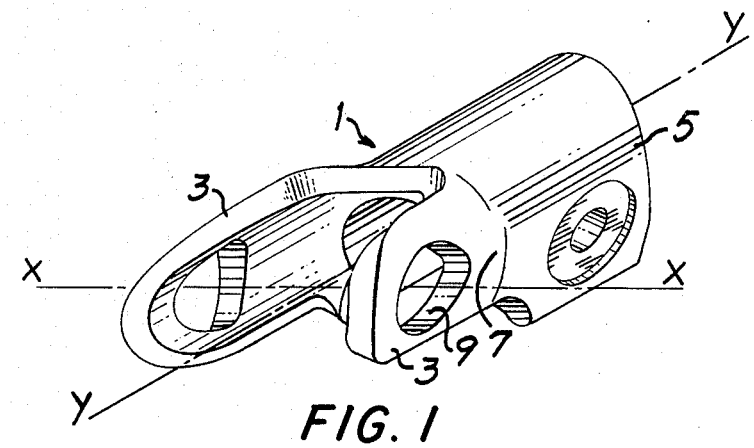
FIG. 1 is a perspective view of a first embodiment of a universal joint yoke in accordance with the invention.

FIG. 1 shows a universal joint yoke 1 formed from a sheet metal blank by cutting, folding and cold rolling in a known manner to have an opposed pair of arms 3, symmetrical about the yoke's rotational axis Y—Y, and having an arcuate or faceted sectional shape (described in more detail below). Advantageously, the arms 3 are connected to a split hub 5 by a substantially toric surface 7. Each arm has a bore 9, having a common axis X—X, and intended to receive, as a push tight fit and in accordance with known technique, the thin-walled, stamped sheet metal race of a rolling or sliding bearing (not shown).

Figure 2:
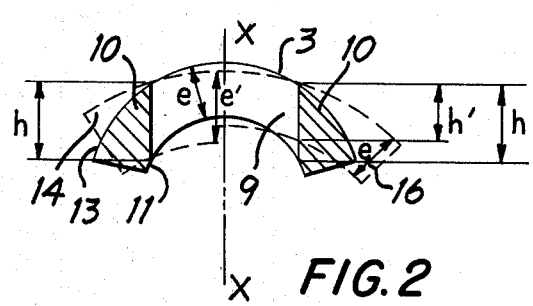
FIG. 2 is an axial cross-section of one arm of the yoke of FIG. 1.

FIG. 2 illustrates how, in accordance with the present invention, it is possible to form a lightened yoke from a thin metal blank which nevertheless possesses a bore depth h sufficient to support the bearing race for the force to be transmitted by the joint.

Each yoke arm is, in fact, formed from a blank of thickness e and has a generally arcuate shape in the section lying in that plane perpendicular to the rotational axis Y—Y and including the common axis X—X (i.e. the section shown in FIG. 2) with the end portions 10 each inturned towards the rotational axis Y—Y. This inturned sectional shape of the yoke arms 3 is thus different from the part-circular arm section of a yoke produced in accordance with the aforesaid United Kingdom Patent Specification No. 1208006 and it enables a bore depth h to be obtained in said plane that is substantially greater than the blank thickness e.

The bore depth h is defined and shown in FIG. 2 to be the distance separating the intersections of the bore 9 in said plane with the internal arm surface 11 and the external arm surface 13.

The left-hand side of FIG. 2 illustrates how for a corresponding part circular section yoke arm 14 (shown in broken line) of a yoke of substantially identical radial size, the blank from which the yoke arm 14 was formed would have to have a greater thickness e' to obtain the same bore depth h. The right-hand side of FIG. 2 illustrates how, for a corresponding part circular section yoke arm 16 (shown in broken line) of a yoke of substantially identical radial size and formed from a blank of the same thickness e, a lesser bore depth h' is obtained.

Figure 3:
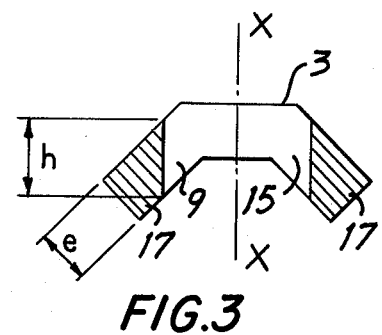
FIG. 3 is a similar arm section for a second embodiment of a yoke in accordance with the invention.

FIG. 3 illustrates the same section of a second embodiment of the invention in which the yoke arms 3 are also arched but have a rectilinear shape with a straight center portion 15 and inclined end portions 17. The bore 9 is shown to include the whole of the center portion 15 and part of the end portions 17. As before, a greater bore depth h is obtained by this inturned sectional shape than is obtained by a part-circular section arm of a yoke of substantially similar radial size and formed of the same blank thickness e. Conversely, and as described with reference to the right-hand side of FIG. 2, a greater blank thickness would be required if the same bore depth in the part-circular section arm was to be obtained.

In a preferred form of the invention the curve enveloping the arcuate section of FIG. 2 or the rectilinear section of FIG. 3 and lying in said plane is based on an ellipse of which the major axis is parallel to the common bore axis X—X.

Figure 4:
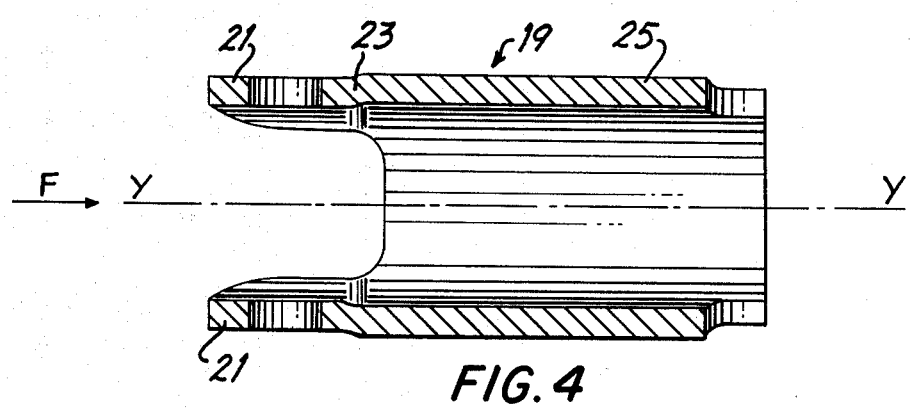
FIG. 4 is an axial section of a third embodiment of a universal joint yoke in accordance with the invention.

FIG. 4 is an axial section of a third embodiment of the invention in which the yoke is made from a length of tubing 19 having, for example, a circular cross-section and of which one end portion is cut to form an opposed pair of yoke arms 21 which are then bent to have an inturned sectional shape. This bending forms a circumferential constriction 23 in the tube 19. The other end portion of the tube forms a hub 25 intended to be coupled in a known manner to a shaft or other force transmitting element, possibly with the interposition of an elastomeric sleeve.

Figure 5:
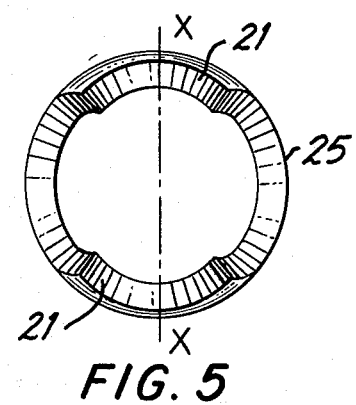
FIG. 5 is an end elevation of the yoke of FIG. 4.

FIG. 5 is an end elevation in the direction of arrow F of FIG. 4 and clearly shows the inturned sectional shape of the arms 21 lying within the enveloping cylindrical form of the hub 25.

This third embodiment could, alternatively, be formed by rolling and then axially welding a sheet metal blank.

The present invention is not limited by the above described embodiments but extends to all forms of universal joint yoke having arms of which the axial cross-section in the region of the bores have end portions that are inturned towards the yoke's rotational axis to enable a bore depth to be obtained that is greater than that of the bores of a yoke of equivalent radial size formed from the same thickness material and having arms wherein the corresponding section is part circular.

I claim:

1. A universal joint yoke having arms of which the axial cross-sections in the region of the bores have end portions that are inturned towards the yoke's rotational axis to enable a bore depth to be obtained that is greater than that of the bores of a yoke of equivalent radial size formed from the same thickness material and having arms wherein the corresponding section is part circular.

2. A universal joint yoke, comprising: a yoke body formed from a metal blank, having a dimension defining an axis of rotation, and having a pair of opposed yoke arms each having a respective bore aligned on a common axis perpendicular to the axis of rotation and each dimensioned for receiving in use a bearing race; each of said yoke arms having a cross section in a plane perpendicular to the yoke body dimension defining the axis of rotation and including the common axis of the bores, and said yoke arm cross sections being enclosed within and in contact with a circle the diameter of which is smaller than the distance between the tops of said yoke arm cross sections so as to provide an increased depth of said bores.

3. A yoke as claimed in claim 2, wherein said metal blank is a sheet metal blank.

4. A yoke as claimed in claim 2, wherein said metal blank is a length of tube.

5. A yoke as claimed in claim 2, characterized in that the cross-sectional shape of said yoke arms is arcuate.

6. A yoke as claimed in claim 5, characterised in that the curve enveloping the arcuate cross section in said plane is based on an ellipse the major axis of which is parallel to the bore common axis.

7. A yoke as claimed in claim 2, characterised in that the cross-sectional shape of said yoke arms is rectilinear with a straight middle portion and included straight end portions.

8. A yoke as claimed in claim 7, characterized in that the curve enveloping the rectilinear section in said plane is based on an ellipse the major axis of which is parallel to the bore common axis.

9. A universal joint yoke, comprising: a symmetrical yoke body having an axis of symmetry and having a pair of opposed yoke arms extending axially from an end portion of said yoke body; each of said yoke arms having a respective bore therethrough aligned on a common axis perpendicular to the yoke body axis of symmetry; and each of said yoke arms having a cross section in a plane perpendicular to the axis of symmetry and containing the common bore axis that is non-circular and is a maximum distance from the axis of symmetry on the bore common axis and which turns inwardly toward the axis of symmetry at a distance away from the common bore axis so that said bores are substantially deeper than the thickness of said yoke arms.

* * * * *